United States Patent [19]

Dirks

[11] 4,058,844
[45] Nov. 15, 1977

[54] LOW-MASS SHORT-STROKE VOICE-COIL ACTUATOR FOR INTEGRATED DISK FILE MODULE

[75] Inventor: Wolfgang Gerhard Dirks, Saratoga, Calif.

[73] Assignee: Burroughs Corporation, Detroit, Mich.

[21] Appl. No.: 673,157

[22] Filed: Apr. 2, 1976

[51] Int. Cl.² .................... G11B 21/22; G11B 21/08; G11B 5/55; H04R 9/06
[52] U.S. Cl. ......................... 360/106; 179/115.5 VC; 360/105
[58] Field of Search .................... 360/105, 106, 78; 179/115.5 VC; 335/231

[56] References Cited

U.S. PATENT DOCUMENTS

| | | | |
|---|---|---|---|
| 2,059,209 | 11/1936 | Cutting | 179/115.5 VC |
| 3,748,407 | 7/1973 | Prieur et al. | 360/105 |
| 3,751,603 | 8/1973 | Prieur et al. | 360/105 |
| 3,979,566 | 9/1976 | Willy | 179/115.5 VC |

FOREIGN PATENT DOCUMENTS

| | | | |
|---|---|---|---|
| 348,198 | 5/1931 | United Kingdom | 179/115.5 VC |

OTHER PUBLICATIONS

Loudspeakers, Jordan, Focal Press, 1963, pp. 58–59.

*Primary Examiner*—Robert S. Tupper
*Attorney, Agent, or Firm*—Alfred W. Kozak; Nathan Cass; Kevin R. Peterson

[57] ABSTRACT

A low-mass low-inductance short-stroke voice-coil actuator used with a positionable transducer and magnetic disk to provide fast memory access in a low cost-per-bit disk file memory system. Enclosed in a sealed disk module, the actuator and transducing system provide access to any disk information track within one disk revolution or less. Integral with said actuator is a total moving mass of less than 50 grams. A short voice-coil, of one inch or less, is always contained within the magnetic flux of the air gap; and the voice-coil, when energized, can provide a full stroke access (across said magnetic disk) within 16 milliseconds. A pair of spider flexures support (for longitudinal movement) a central rod, which is part of a differential velocity transducer and which is integral with the voice-coil. The central rod is also capable of being rotated by a solenoid to turn a cam which will "unload" or remove the transducing heads away from the disk surfaces.

14 Claims, 8 Drawing Figures

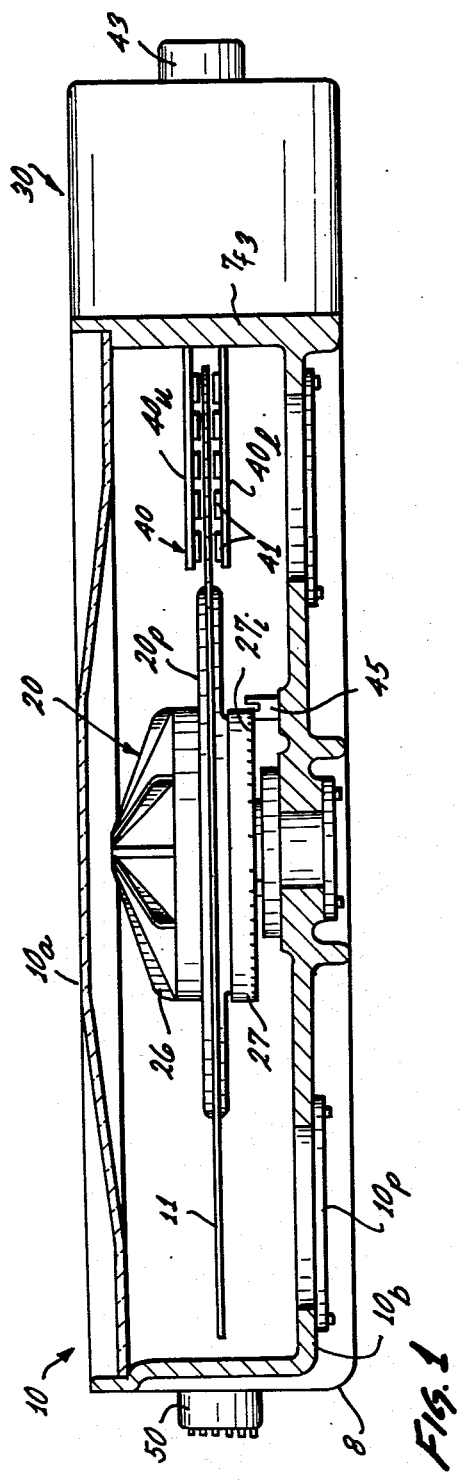
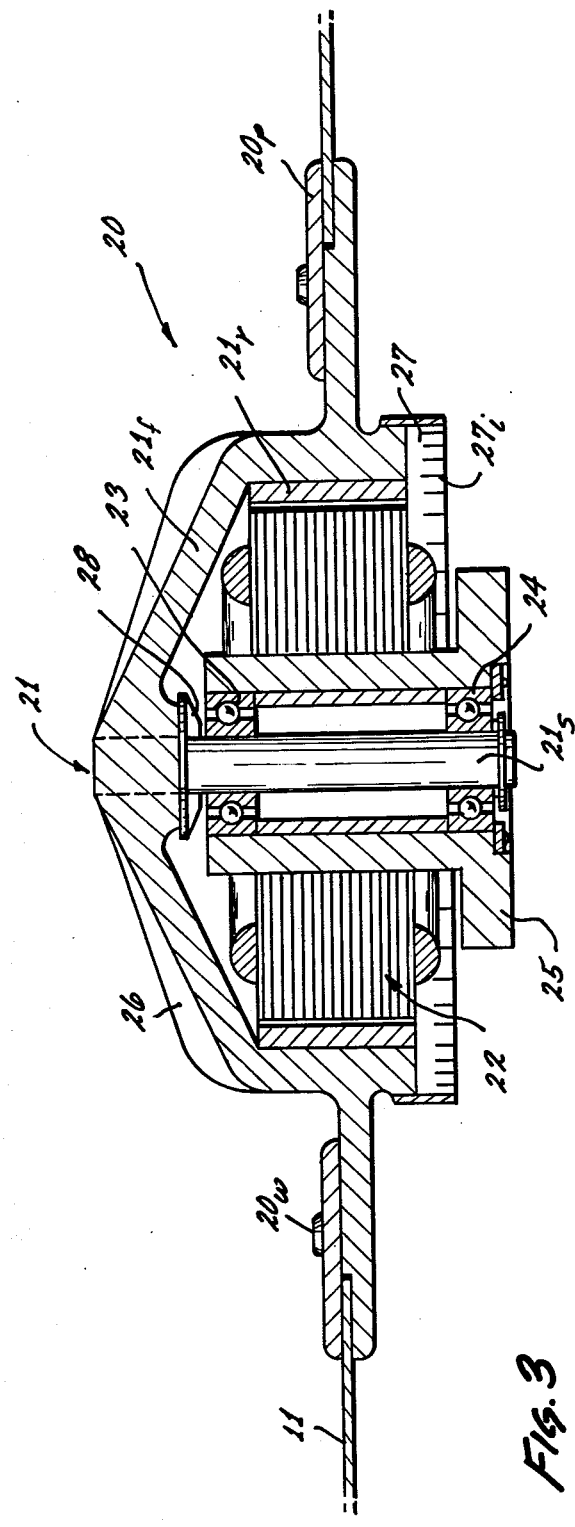

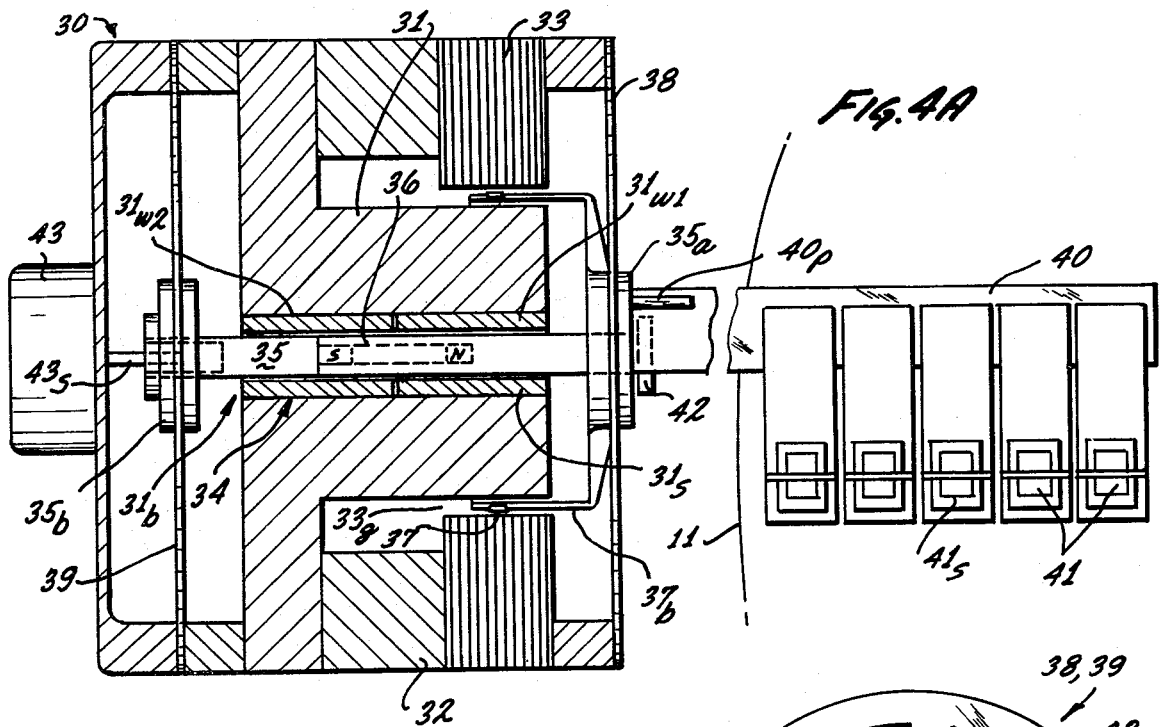
FIG. 4A
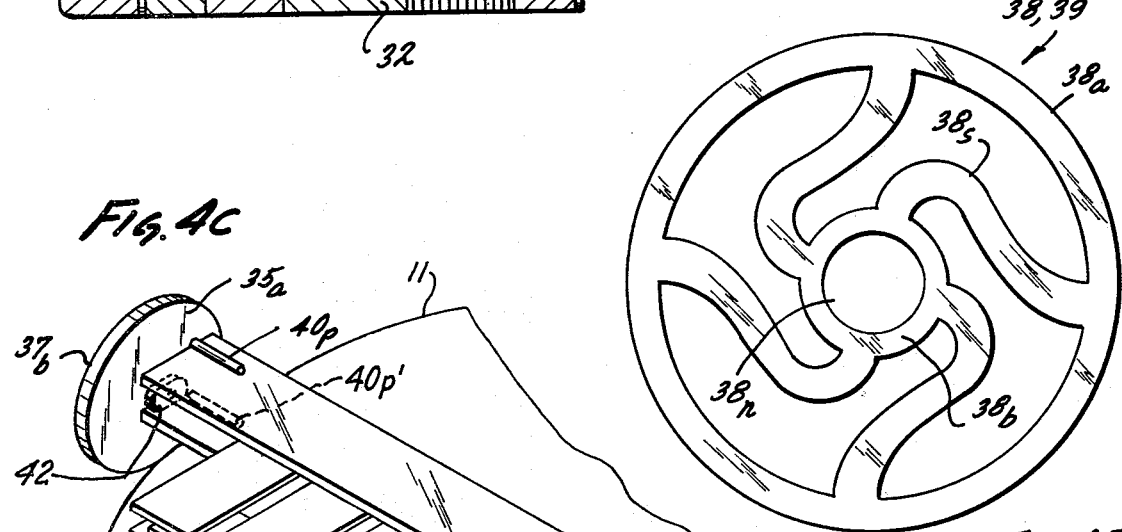
FIG. 4B
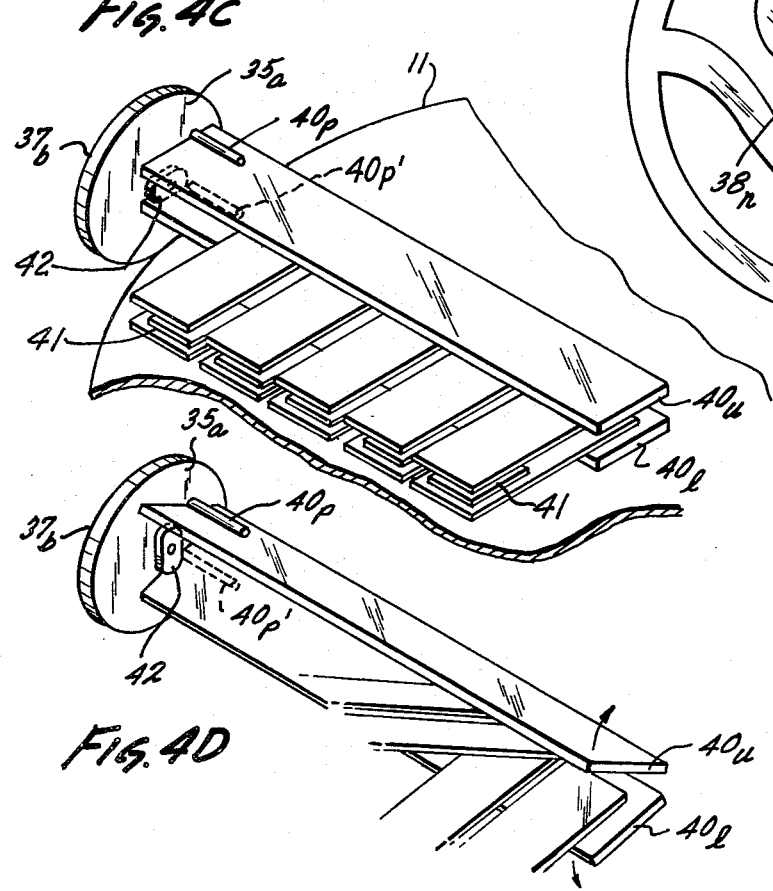
FIG. 4C
FIG. 4D

LOW-MASS SHORT-STROKE VOICE-COIL ACTUATOR FOR INTEGRATED DISK FILE MODULE

FIELD OF THE INVENTION

The voice-coil actuator of the present invention pertains to the field of random-access disk drives permitting very low cost-per-bit storage and access, wherein the voice-coil actuator has a short stroke motion and provides fast access due to the small mass moved. The actuator has particular use in combination with a sealed Disk File Module and memory system also described herein.

BACKGROUND OF THE INVENTION

The desirability of disk file units which can readily be removed and replaced or interchanged with other units has long been recognized.

However, some liabilities have occurred in the prior art in attempting to achieve this goal in that expensive and unwieldy "base units" were often required which would mechanically interconnect to the disk module in order to provide a driving force (for the disk pack and head carriage) through a shaft or a belt, at the same time attempting to seal off any contamination from the outside air or environment. This was typically the case in the "Winchester" disk unit as described in U.S. Pat. No. 3,843,967. These type of disk units, further, were not readily adaptable for use with the power frequencies of foreign countries (such as 50 Hz.) nor aircraft power at 400 Hz.

Other prior art attempts have been made in this area by providing sealed enclosures with transducers having head-per-track configurations. These usually proved to be extensively expensive and uneconomical.

The use of high-capacity random-access disk drives which permit operator interchangeable disk packs has usually been burdened with excessive costs. The interchangeability costs include additional control electronics and hardware for disk pack loading-and-unloading, for stringent contamination protection, for actuator carriage retraction, for head unloading, and adding mechanical couplings for spindle and head carriage driving. In order to offset these high costs, prior art disk drives are designed for very high capacity using many stacked disks and required relatively large drive motors having high power consumption; thus they were not really economically usable by a medium-to-small scale storage system.

One of the major costs of designing-in disk pack interchangeability (while keeping medium to low capacity storage) lies primarily in the alignment of the disk unit's transducing Read/Write heads, which must fly precisely relative to the disk surface. The head-to-disk track alignment must be sufficiently accomplished so that a disk unit, once written, may be removed and subsequently read on any of the other disk drive units. Thus, radial alignment of the transducing head with respect to the record track on the disk must be within 20% of the track width. The radial alignment tolerances must include static tolerances associated with head alignment differences between different drives, as well as dynamic tolerances involved, such as spindle-bearing runout, disk axial runout, actuator carriage bearing runout, thermal drift, vibration, and position accuracy of the access servo system.

Contamination during a disk pack exchange can have a serious effect on the reliability of a disk drive. When the disk pack module is removed from its "base drive," then the disk chamber, the disk pack mounting cone, and the transducing Read/Write heads (which are the most sensitive parts of the drive) are completely exposed to the environment.

Since the transducing heads often fly as close as 25 microinches to the disk surface, particles not visible to the naked eye, can cause disastrous failures.

In order to overcome some of the above problems and limitations, certain manufacturers built the "Winchester" disk cartridge, where disk cartridges were made to contain certain critical components (spindle, disk, read/write transducing heads, and an "actuator carriage") in an enclosed package.

This type of packaging somewhat reduced the costly positioning requirements for radial alignment and also facilitated greater track and bit density then was previously possible. Also at the same time, the reliability was greatly enhanced. However, since the "Winchester" disk cartridges did not contain the actuator voice-coil motor nor the spindle-motor, it was necessary that additional complex hardware be added to each disk cartridge, and each cartridge had to be supplied with a "base drive" in order to automatically couple the cartridges' "actuator carriage" to the voice-coil motor and also to couple the internal spindle to an external motor.

Besides being costly, these external-internal couplings introduced adverse reliability factors due to tolerance requirements, to possible mechanical failure; they also prevented complete sealing of the disk cartridge itself.

Further the "base drive" units (which were required for each disk module) had a cost factor of generally six times the cost of the disk module. Thus, if the disk module cost $1500.00, the base drive would generally cost at least $9000.00.

SUMMARY OF THE INVENTION

A low-mass, fast-access actuator unit is provided for use with a compact, slim-lined, self-contained Disk File Module, which module is completely sealed, requires no external mechanical couplings, and which facilitates interchangeability since the only coupling required is an electrical connector. The Disk File Module contains a motorspindle unit which has the rotor of the drive motor integrated as one unit with the magnetic disk having a single high-density ferrite film on each surface.

With the sealed enclosure of this preferred embodiment is a short-storke (+ or − ¼ inch) low power voice-coil motor or "actuator" which supports and positions a series of Read/Write transducing heads over the top surface and bottom surface of the magnetic disk. A head support arm, which holds and positions the transducing heads, is directly connected to the voice-coil, thereby eliminating the mechanical problems of the prior art which required internal "actuator carriages" which then were coupled to external actuator carriage drive-means outside of the sealed enclosure.

In the preferred embodiment, additional advantages are obtained by the use of low-mass transducing heads and the elimination of the massive carriage means formerly used, permits worst-case access times to occur in less than one rotation (16 milliseconds). Also the Disk File Module contains no components subject to friction and wear except for two bearings in the motor-spindle which provide a long, extended life cycle of at least seven years.

The cost-per-bit factor of this preferred embodiment of the Disk File Module is less expensive than the bit cost in multiple-disk large capacity systems, and less expensive than prior art small-capacity systems which required actuator carriages and extensive mechanical coupling hardware such as was required in the "Winchester" disk cartridge; at the same time, the expensive "base drive" unit has been eliminated in favor of an "Electronics Module" which provides control signals and a data-interface to the Disk File Module.

Further, this elimination of the entire base-drive mechanism, (such as the drive motor, drive pulley and exterior connecting mechanisms as exemplified by the Winchester system) thus reduces the overall amount of manufacturing usage and maintenance costs of the Disk File Module system while the reliability and the versatility of application is increased.

Since the motor drive unit is concentric with the center of the magnetic disk, and the rotor is integrated with the disk to form a substantially planar structure, the overall volume required is economically small and presents a slender thin-line package. Further, since the module only requires a low power motor unit (1/100 horsepower), it can be easily made independent of AC line power frequency variations. This is done by using a crystal-controlled internal frequency reference in the Electronics Module which powers the disk drive motor independent of AC line power frequency.

The voice-coil actuator in this preferred embodiment of a Disk File Module has approximately ten times less mass than prior art actuators and has a voice-coil one-fourth the axial length of prior art coils. The low mass and high conductivity permits small control currents to develop very fast access time in seeking the desired track on the disk.

One of the economies provided by the preferred embodiment of the Disk File Module described herein is the factor of interchangeability. The factor of interchangeability of a Disk File Module makes possible great economy of manufacture and usage, the convenience of easy maintenance by simply interchanging a module and the lower cost of maintenance time. Additionally the design of the hardware elements and the tolerances involved in the mechanical, electronic and magnetic implementation of the Disk File Module has been so arranged that the summation of all of the deviations from perfection does not exceed the total variance allowed for engineering tolerances.

Further, the sealed Disk File Module prevents any exposure or contamination of the internal atmosphere and the precisely defined positions and locations of the mechanical components in relationship to the disk.

Still further the preferred embodiment offers significant advantages over conventional type of disk file recording systems which are solely dedicated to "head-pertrack" transducing systems. These conventional systems involve many hundreds of transducers and complex matrix switching networks which are very costly, even though they permit the elimination of moveable transducing heads and actuators. However, in the presently described embodiment, the actuator's moveable arms and transducers, in conjunction with the reference position tracks of the magnetic disk, provide for an economical, yet at the same time precise, position seeking system which is sufficiently easy to duplicate and thus, to make interchangeable for each of a plurality of modules. And yet, in the instant system described herein, there is permitted the versatility of using both positionable and fixed head-per-track transducers singly or in combination.

BRIEF DESCRIPTION OF THE DRAWINGS

FIG. 1 is a side cutaway view in elevation of the Disk File Module.

FIG. 3 is a cross section view in elevation of the motor-spindle assembly showing how the disk is integrated with the rotor.

FIG. 4A is a schematic cross section view of the voice-coil actuator assembly used to position the transducing heads.

FIG. 4B shows a top view of the spider flexure for the actuator.

FIG. 4C is a perspective sketch of the upper and lower transducing platform support arms in the loaded position (transducers on magnetic disk).

FIG. 4D shows the unloaded position of the platform support arms (transducers moved away from magnetic disk).

DESCRIPTION OF THE PREFERRED EMBODIMENT

Figure 2:
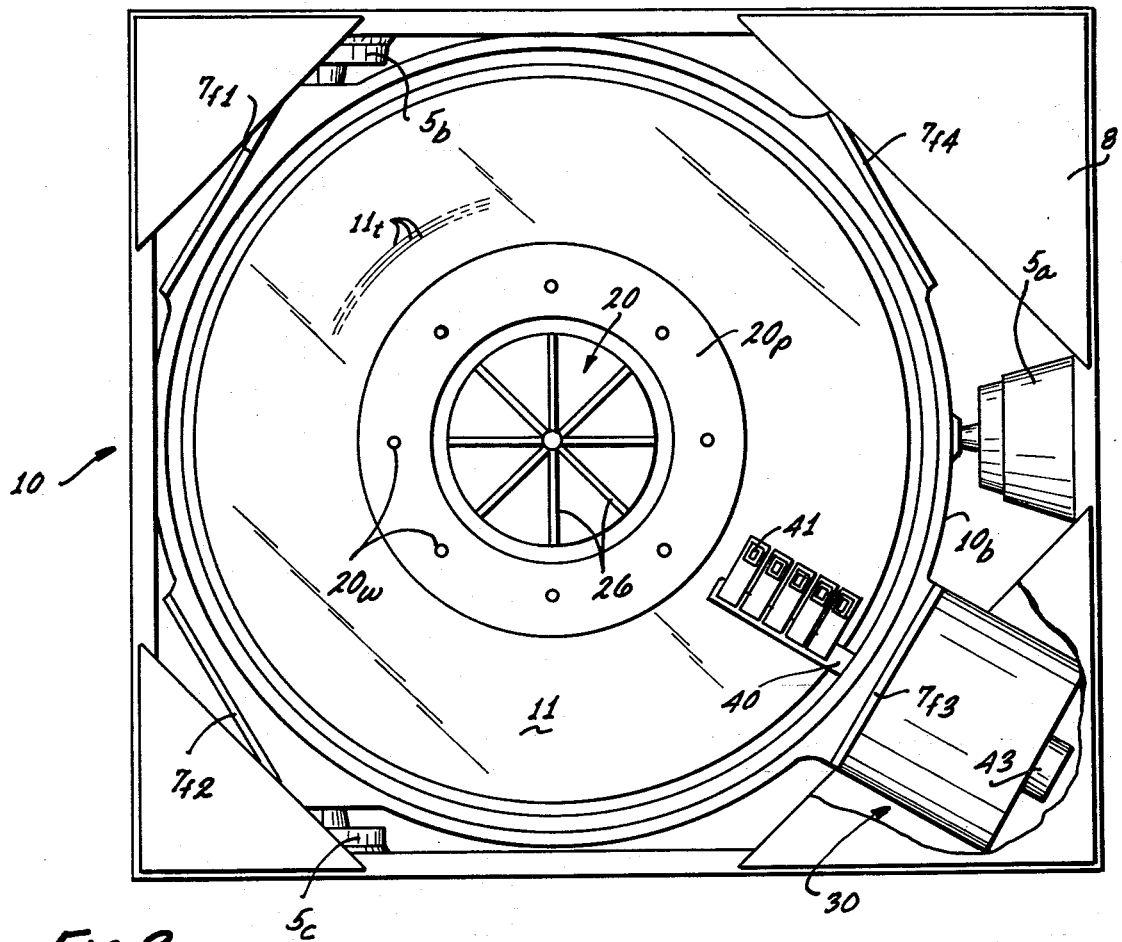
FIG. 2 is a top or plan view of the Disk File Module with the transparent cover through which can be seen the disk.

Referring to FIGS. 1–3, there is seen one preferred embodiment of the integrated Disk File Module, wherein a sealed module 10 is formed of a base plate casting $10_b$ (having a transparent top plate $10_a$) and a sheet metal enclosure 8. A motor-spindle unit 20 has holding plates $20_p$ which hold and support a magnetic disk 11.

The casting $10_b$ has flanges $7_{f1}$, $7_{f2}$, $7_{f3}$, $7_{f4}$, (FIGS. 1, 2) of which $7_{f3}$ supports an Actuator Unit 30 which is generally of the voice-coil actuator type. A group of transparent inspection plates $10_p$ is built into the casting $10_b$ for inspection purposes. The Actuator 30 (FIGS. 1, 4A) will be seen to have a rotary solenoid 43 while providing a head support arm 40 (having arms $40_u$ and $40_l$ in FIG. 1 and FIG. 4A) which hold a plurality of Read/Write transducing heads 41 in close proximity to the upper and lower surfaces of the disk 11. An electrical connector 50 (FIG. 1) which conveys electrical signals into and out of the sealed module is the only connection to the outside world of the Disk File Module. A more detailed description is provided in conjunction with the discussion of FIGS. 4A, B, C, and D.

The motor-spindle unit 20, with its support plates $20_p$ for holding the disk 11 forms an integral rotating unit which also has a series of air circulating fins 26 and a cylindrical encoder 27 having indicia marks $27_i$, which move in proximity to a mark sensor 45. The rotor $21_r$ (of FIG. 3) constitutes a cylindrical nickel-cobalt form which revolves about stator 22.

Referring to FIG. 2 which shows a top or plan view of the Disk File Module, the module 10 is seen to have a sheet metal enclosure 8, a base-plate casting 10 wherein three shock mounts $5_a$, $5_b$ and $5_c$ provide resilient support to the sealed module within the sheet metal covering 8.

The spindle unit 20, having fins 26 and a support plate $20_p$ hold the circular disk 11 via screws $20_w$. A series of transducer heads 41 are supported by the head support arm 40 which is controlled by the Actuator 30 for the positioning of the heads radially along the disk 11.

Referring to FIG. 3, a central cross sectional view in elevation is shown of the motor-spindle assembly unit 20. A central shaft $21_s$ is supported by a top bearing 23 and a bottom bearing 24 which bearings are held by the support frame 25.

The support frame 25 mounts the stator core and windings 22, around which may rotate the rotor unit 21 which is held by a rotor frame $21_f$. The rotor $21_r$, the rotor frame $21_f$ and shaft $21_s$ together comprise rotor and shaft unit 21, which is fastened to the disk 11 to form an "integrated" rotating unit.

A loading spring 28 preloads the top bearing 23 and bottom bearing 24.

Referring to FIG. 4A, there is seen a central cross section view, in elevation, of the voice-coil Actuator assembly 30. The Actuator assembly is seen to have a central pole 31 which has an axial bore $31_b$ holding a differential velocity transducer 34. The velocity transducer has a central support rod 35 which holds a velocity transducer magnet 36. The support rod 35 is built with extremity extensions $35_a$, $35_b$ held within front and rear spider flexures 38 and 39.

A voice-coil bobbin $37_b$ holds a cylindrical voice-coil 37 which rides in the gap between the central pole 31 and the laminated pole pieces 33 of the ring magnet 32. The voice-coil 37 has high conductivity and its axial length is small compared to the air gap $33_g$ between the pole pieces of elements 33 and 31. Thus during its ¼ inch stroke, the voice-coil never comes near or passes beyond the fringes of the air gap.

By regulating the current through the voice-coil 37 the head support arm 40 will move to precisely regulated positions along the tracks of the magnetic disk 11. More details of the Actuator 30 will appear in the later detailed discussion of FIG. 4A.

A rotary solenoid 43, designated as the load/unload solenoid, is capable of rotating the central support rod 35 which connects to a cam 42 at the opposite end. The cam 42, when rotated, is capable of positioning the transducing heads 41 away from the surface of the magnetic disk 11. This load/unload cam 42 is arranged so as to control the upper transducing heads $41_u$ as well as the lower transducing heads $41_l$ (FIG. 1), as will be later described in detail.

Figure 5:
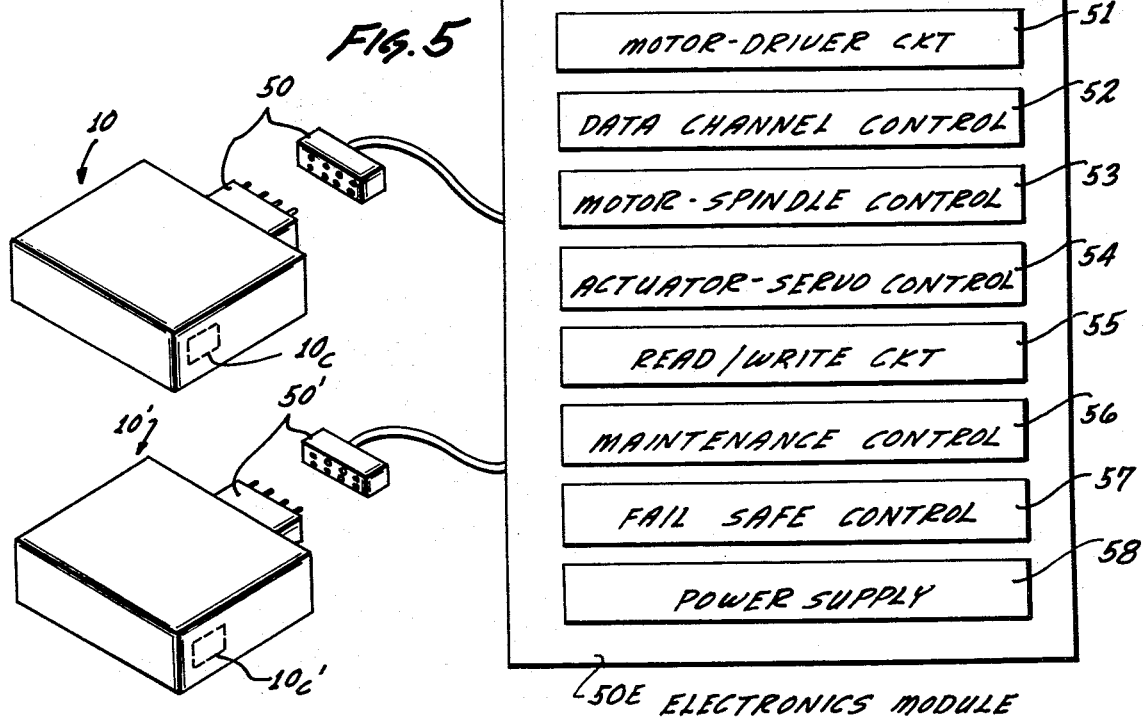
FIG. 5 is a schematic view of the entire Disk File Module system and indicating the electrical interconnection between the Electronics Module and the two Disk File Modules it services.

FIG. 5, which will be described in detail hereinafter, shows the overall memory storage and access system by which one Electronics Module 50E provides control and service to two Disk File Modules 10 and 10'.

DETAILED DESCRIPTION

Referring to FIGS. 1 and 2 which respectively show a simplified cross-sectional view and a simplified top view of the Disk File Module, it will be seen that a thin-walled ribbed die-cast aluminum base plate $10_b$ may typically provide structural support as well as enclosure for the motor-spindle 20, disk 11, transducer heads 41 and head-positioning arm 40. Visual inspection is provided for by a transparent top cover $10_a$ which is held by the sheet metal enclosure 8.

The mounting flanges $7_{f1}$, $7_{f2}$, $7_{f3}$, $7_{f4}$, on the side wall of the base plate $10_b$ may support a single voice-coil Actuator 30, or may support a plurality of actuators, such as voice-coil Actuator 30. Further, the four flanges may be used for a combination of transducing systems involving both positionable type and head-per-track type of transducing systems without the exclusive requirement of a fully complete (and costly) head-per-track transducing system.

In a typically preferred embodiment the overall dimensions of the Disk File Module may be approximately 4 inches high by 15 inches wide by 18 inches deep and the total weight is less than 20 pounds. An electrical connector 50 is used to facilitate automatic electrical hook-up when the Disk File Module is plugged into its mounting rack in the Electronic Module 50E (FIG. 5).

Referring to the motor-spindle assembly 20 which is shown in FIG. 3, this structure is made of a fixed stator portion 22 and a rotatable portion 21 which comprises rotor $21_r$ and rotor frame $21_f$ in addition to the rotor shaft $21_s$. The motor may typically be a one/one-hundredth horsepower, 12 volts AC synchronous hysteresis motor, which can operate in the range of 2400–3600 rpm.

The preload spring 28 exerts pressure on precision bearings 23 and 24 which may be of a type having a minimum continuous duty life of 7 years. Such bearings are basically the only components of the Disk File Module subject to friction and wear and thus are made of high quality precision components.

The motor speed is precisionally controlled by a motor spindle control 53 using a Crystal Reference Unit in the Electronic Module 50E (FIG. 5) which may typically be set to control the motor rotation at 3600 rpm. The speed may be simply changed to 2400 rpm by switching to a different reference frequency. This permits unusual versatility over the prior art systems where a speed change involved complex changes in gearing and belt drives. Thus, rapid data-transfer rates can be handled in this embodiment by the higher 3600 rpm speed while low speed data-transfer requirements are handled by the 2400 rpm rotational speed.

While prior systems customarily required ⅛ horsepower (or more) motors to drive a grouped stack of magnetic disks (in order to get large data capacity per unit so as to lower the cost-per-bit of handling disk data-storage) the present system permits a low power motor consuming, for example, 10 watts or less and occupying a relatively small volume. Typically a Disk File Module and system in accordance with the invention provides a low cost-per-bit function of approximately 0.5 millicent per bit which is at least two times cheaper in cost-per-bit functions than disk systems of the prior art. Further this low cost-per-bit capacity is contained in a spatial slim-line volume approximately one-half the size of prior Disk File Modules. Thus, there is provided not only an optimal cost-per-bit but also optimal size per overall bit capacity. Further optimization occurs in that one Electronic Module, as 50E (FIG. 5), services two or more Disk File Modules rather than an expensive "base unit" for each single disk module as required previously.

The synchronous motor used herein may typically operate at 12 volts RMS at a 120 cycle regulated frequency. It is independent of AC power line variations due to the internal frequency reference unit in the Electronic Module 50E. The rotor $21_r$ is a cylindrical form of nickel-cobalt having a plate $20_p$ which integrates the rotor with the disk 11 to constitute a unitary rotational unit.

In the cross sectional view of FIG. 4A there is seen the voice-coil Actuator assembly 30. The head mounting platform or head support arm 40 shown in FIG. 4A is actually made up of an upper arm $40_u$ and a lower arm $40_l$ (See FIGS. 1 and 4C) and these arms are directly connected to a short 2-inch diameter voice-coil bobbin $37_b$ of FIG.4A.

A small low-inductance voice-coil 37 is wound on the voice-coil bobbin $37_b$. The voice-coil 37 always remains within the air gap $33_g$ between the laminated pole piece 33 and the cylindrical center pole 31.

The actuator has one unitary moving structure composed of the central support rod 35, the voice-coil bobbin $37_b$, annular support ends $35_a$ and $35_b$ for the central support rod 35, voice-coil 37, and the head mounting platform arm 40 with its transducing heads 41.

The center pole structure 31 of magnetic material has an axial bore $31_b$ in which resides a metallic magnetic-insulator shield $31_s$. Within the shield $31_s$ there resides a stationary pair of windings $31_{w1}$ and $31_{w2}$.

Within the axial bore of these windings the central support rod 35 is capable of straight longitudinal movement via the restrictions of the flexures 38 and 39 (FIGS. 4A and 4B). Within the central support rod 35 resides a velocity transducer magnet 36 which together with the windings $31_{w1}$, $31_{w2}$ constitute a differential velocity transducer 34 for conveying signals relative to position and speed of displacement of the central support rod.

The lower end of the central support rod 35 is accessed by a rotary solenoid 43 through a splined shaft $43_s$. This enables the rotary solenoid to rotate the central support rod 35 on its axis within the shield $31_s$. Rotation of the central support rod 35 will cause the load/unload cam 42 to be rotated into a different position between the upper and lower head support arms $40_u$ and $40_l$ (FIG. 4C). It will also be noticed that (in FIG. 4A and 4C) a pivot $40_p$ provides a rotational pivot for the upper support arm $40_u$ while a pivot $40_p'$ provides the pivot for the lowest support arm $40_l$ (FIG. 4D).

FIG. 4B shows a top view of the spider flexures 38 and 39. A circumferential band $38_a$ supports a series of spiral projections $38_s$ which hold a central bearing $38_b$ having an axial bore $38_n$.

The diagrammatic sketch of FIG. 4C indicates how the voice-coil bobbin $37_b$ supports the transducing head platform arms $40_u$ and $40_l$. The cam 42 is disengaged from the arms $40_u$ and $40_l$ so that the transducing heads would be "loaded" i.e. in contact with the surface of the disk.

Referring to FIG. 4D, it will be seen that the cam 42 has been turned between the upper and lower head platform support arms to exert turning pressure on the upper and lower arms $40_u$ and $40_l$. This action "unloads" the transducing heads, i.e. removes them away from the surface of the disk.

The coaxially-mounted differential velocity transducer 34 has a magnet 36 embedded in the suspension-support rod 35; and the entire moving mass (consisting of the transducing Read/Write heads 51, the track follower servo head $41_s$, (FIG. 4A), the upper and lower head mounting arms $40_u$ and $40_l$, the voice-coil 37, bobbin $37_b$ and the suspension rod 35) may typically be approximately 40 grams.

In the preferred embodiment being described in actuator assembly's center of mass is exactly in line with the center of force. The actuator's small mass (which may typically be 30 times less than that of a "carriage-type" actuator) is suspended by two spring flexures 38 and 39 which are similar to loudspeaker "spiders." This small mass, typically, has a total travel of not more than plus or minus one-quarter of an inch. This moving mass, (consisting of 9 Read/Write heads, the servo head, upper and lower arms, the voice-coil, the bobbin, and central rod) of typically approximately 40 grams provides a minimum mass factor which permits an access time of less than one disk rotation with a voice-coil motor actuator requiring one-tenth less force than conventional voice-coil actuators. In physical size the voice-coil motor or actuator assembly is approximately equal to that of a 20 watt loudspeaker driver.

One advantageous feature of the voice-coil actuator of FIG. 4A is the fact that the voice-coil is very short, that is 1 inch or less, and it always remains completely within the total field between the laminated pole piece 33 and the center pole 31 of the voice-coil actuator. This may be contrasted with prior art voice-coils which constituted lengths of 4 inches or more and in which only a part of the voice-coil remained within the full field of the pole piece 33 and center pole 31. Thus, much of the generated energy was dissipated in heat and further there was a massive amount of iron and magnetic hardware which was required for long strokes (which may be up to $3\frac{1}{2}$ to 4 inches where the transducing heads and head arms are completely retracted away from the disk and must be moved a relatively long distance in order to reach the disk and then to recover the radial distance across the disk).

Prior art actuators required that the massive arm and transducing heads be guided by a group of precision bearings and guide rods. These have been completely eliminated in the present embodiment and, since the stroke is typically only $\pm \frac{1}{4}$ inch or less, the holding system for the moveable central rod 35 is merely a set of spider flexures, (front flexure 38 and rear spider flexure 39). This eliminates much mass from the system and eliminates the conditions whereby bearings (when used) could get contaminated, worn, or stuck due to foreign particles. A spring flexure such as used here has practically no maintenance problems over a period of time once the quality of the spring flexure is guaranteed.

The Read/Write transducing heads are conventional flying heads which are designed to contact the disk recording surface during starting and stopping, and then "fly" for transducing operations. Since the motor-spindle assembly 20 is not designed for fast acceleration, but instead is optimized for low weight and minimum power consumption at operating speeds, the head-to-disk contact time during starting and stopping may be too long for safe long-term operation. This is the reason why the previously disclosed head-loading mechanism is combined with the actuator to increase reliability. This head-loading mechanism consists of a rotary solenoid 43 at the end of the Actuator drive assembly 30 and a cam 42 at the opposite end of the assembly. The rotary solenoid 43 rotates the central support rod 35 through a normally noncontacting spline $43_s$. The support rod 35 connects to cam 42 at the other end of the assembly which causes the upper and lower head-mounting arms $40_u$ and $40_l$, to rotate slightly and lift the heads off of the recording surface (FIG. 4D). Each of the head-mounting arms $40_u$ and $40_l$, are rotatable around a pivot such as pivot $40_p$ shown in FIG. 4D. The cam 42 is a detenting cam so that the rotary solenoid 43 only has to be operated during loading and unloading operations. As seen in FIG. 4C and 4D the transducers 41 reside on the head support arms $40_u$ and $40_l$ in a position farthest away from the side of the head support arm which is pivoted at $40_p$ and $40_p'$.

Thus during the "unloaded" position, as seen in FIG. 4D, the transducing heads 41 are moved outward and away from the magnetic disk 11 which passes between the upper and lower head support arms. However, in the "loaded" or the closed position of FIG. 4C, the transducers 41 are now seen to reside in engagement to the magnetic disk 11 so as to magnetically contact the surface of the rotating disk.

The central support rod 35 is permitted to rotate in the two spider flexures 38 and 39, and a heavy spring preload at the pivot points prevents servo instability caused by play at the pivot points.

The most critical performance area involves the disk and the Read/Write transducing heads. In this regard this embodiment uses the field-proven "Winchester" technology whereby the Read/Write transducing head has a very light weight of approximately one-third of a gram and its air bearing requires a force of only 10 grams which facilitates starting and stopping of the head in contact with the disk. The flying height of the transducing heads is typically approximately 25 microinches and the head has a ten megahertz resolution. Further, the simplified construction of these type of transducing heads contributes to lower costs.

Disk 11, having information tracks $11_i$ is a high density 14 inch dia. disk having ferrite film as the recording medium. As previously discussed, the disk is made as an integrated unit of the rotor portion of the motor-spindle assembly 20. This integrated unit comprises the disk 11, the holding plate $20_p$, the rotor frame $21_f$, the rotor $21_r$ and the shaft $21_s$. The integrated rotor arrangement, placed concentrically about the stator 22 of the motor-spindle assembly unit 20, forms a very slim-lined configuration which saves spatial volume and presents a compactly balanced unit. The slim-line compactness permits a substantially planar configuration for the motor drive assembly and its disk portion.

In the overall system schematic of FIG. 5, the Disk File Module is connected by electrical connector 50 to an Electronic Module 50E.

The Electronic Module 50E is separate from the Disk File Module 10 and interconnects only by electrical cables through connector 50. The Electronic Module has a number of electronic control components, such as Motor Driver circuit 51 which may conventionally comprise two digital amplifiers which drive the two windings of the 12 volt AC hysteresis synchronous motor-spindle 20. Both windings conventionally have a series capacitor (not shown) to assure reasonant operation. A crystal oscillator and electronic frequency divider (not shown) in the Electronic Module 50E is typically employed in a conventional manner to generate the two phase-shifted digital motor signals. Since the relatively high current of the actuator voice-coil assembly 30 (which is typically four amperes peak) cannot be multiplexed easily for shared operation, a 20 watt hybrid power amplifier is used in the Electronic Module 50E.

Referring to FIG. 5, the Disk File Module 10 is plug compatible via connector 50 to the electronic Module 50E. The Disk File Module typically includes a Printed Circuit Board $10_c$ which provided conventional circuitry such as Read Pre-Amp, a Head Switching Matrix and a Write Driver (not shown).

In a manner well known in the art one Electronic Module 50E may handle and service at least two Disk File Modules such as 10 and 10' having Printed Circuit Boards $10_c$ and $10_c'$. Connectors 50 and 50' provide connection from the two Disk File Modules to the single Electronic Module. Thus, there has been eliminated the requirement for a costly separate "base drive" unit for each Disk File Module.

The Data Channel Control unit 52 may also be a conventional electronic unit which performs level conversion with receiver/drivers for data, clock, address and control signals. The Data Channel Control unit 52 provides Read/Write control circuits which are used, for example, in conjunction with the well-known double-density modified-frequency modulation system for the reading and recording of data on the disk file 11.

The Data Channel Control unit 52 typically includes a crystal oscillator and a phase-lock-loop detector (not shown). The crystal oscillator is used in a conventional manner to control, after proper frequency division, the speed of the synchronous motor and is also used to generate the write clock. Due to the crystal-controlled synchronous motor, the tracking range of the phase-lock-loop detector will be very narrow, thus facilitating short lock-in times and therefore reduced gap sizes.

The Motor-Spindle Control unit 53 may be used to control the operation of the motor-spindle assembly 20. The particular low power hysteresis synchronous motor-drive used herein is designed for most efficient operation at speeds of, for example, 2400–3600 rpm. The rotational speed of this motor is determined by the frequency division signals based from the write crystal oscillator. Thus, there is derived a highly accurate motor-spindle frequency which will permit maximum data rates and maximum bit densities. The motor signals, which are phase-shifted for proper operation of the motor-spindle, are supplied to the two digital motor drivers built into the Electronic Module 50E. The power for the motor drivers is supplied by a DC source, which could be a battery.

It is typically desired to bring the disk 11 up to its proper speed within, for example, 60 seconds, and to do so, twice the normal run torque is needed. Thus, the motor-spindle unit 20 is overdriven with a 50% greater voltage during acceleration and deceleration.

The Actuator Servo Control unit 54 which may also be of conventional form is used to regulate the voice-coil motor actuator assembly 30.

The Read/Write transducing heads 41 are positioned above and below the required tracks with a dual loop (velocity and position) track follower servo system known in the art. Velocity feedback is generated from the co-axial differential velocity transducer 34, and position feedback is derived from a band of, for example, 251 pre-recorded servo tracks located on one side of the disk in the middle of the data bands.

As previously mentioned the transducing system may use five upper transducing heads and five lower transducing heads, one of which is used as a "servo head." Each head will have a data band of 250 tracks. This makes a total of 2,250 information tracks plus 251 servo tracks on a given disk.

There are many conventional ways for "track seeking" and for servo positioning. One typical way which may be used may be described as follows. For initialization purposes after the disk file module has been assembled and sealed, the servo head $41_s$ will be used to record 251 servo tracks on the underside of the magnetic disk and each of these tracks will have its own particular address. If, for example, the first track of a servo track group is contacted by the servo head $41_s$, the servo head will read out information from the first servo track, its level will be raised by an amplifier and then fed to a "level logic unit" which will maximize the output signal from the information on the servo track number 1. Then the "level logic output" from the level logic unit will be fed to an "enable decoder." Thus, the signals which were read out from the track will carry the information of an "address", which information is then fed from the "enable decoder" to a comparator.

The comparator will also have another input of the "desired" track address. Then, as a result of the comparison in the comparator between the desired address and the presently existing read-out address, several signals will be developed out of the comparator. One signal coming out of the comparator will be the "magnitude of error" between the two addresses which will be used to develop a signal called a "velocity input signal," which is fed to a "positioning logic unit" which is amplified by an amplifier and used to operate the voice-coil to make it move in the proper direction of the desired address track.

Another signal coming from the comparator may be called the "directional signal" and this signal determines the direction the voice-coil must move in order to seek and reach the desired track of the servo track group. Of course, when this direction signal is "zero" this means that the voice-coil has already positioned itself over the appropriate servo track. Usually there is also a signal line from the "level logic unit" over to the positioning logic unit so that the signal read out from the servo track can be maximized and can be fed into the position logic unit. Also there is a direct line from the amplifier of the servo head which goes directly to the "enable decoder."

Thus, this "positioning servo" system provides a comparator having two inputs, one input of which is the track address of the desired track and the other input of the address of the presently existing track. The comparator then provides an output signal to the positioning logic unit and its amplifier which provides the current necessary to move the voice-coil in the proper direction and at the appropriate speed in order to most rapidly access the desired track.

Typically each of the transducing heads 41 (and the servo head $41_s$) will have its individual pair of head driver amplifiers and playback amplifiers.

Each transducing head (and also the servo head $41_s$), through its magnetic pickup provides a signal. This signal is conveyed to a playback amplifier which may feed to a multiplexer integrated circuit. The multiplexer integrated circuit may have 9 input lines (for example, one from the playback amplifier of each individual transducing head). Further, there may, for example, be three address lines which feed into the multiplexor integrated circuit to provide a "head address." Thus, the multiplexor (depending on the head address) will connect a line at any given moment of time to the particularly selected transducer head.

Each of the transducer heads also will have another amplifier called the "head driver amplifier" which is used to increase the current to the transducing head for "writing" purposes; thus, no matter whether there is a "reading operation" or a "writing operation," there will be sufficient current developed so that the transducer head may adequately write on the magnetic disk or may provide an adequate signal when it is reading from the magnetic disk.

The differential velocity transducer 34 (FIG. 4A) provides two stationary windings $31_{w1}$ and $31_{w2}$ which, by magnetic induction, are sensitive to motion of the north and south poles of the bar or pole magnet 36 which moves in correspondence with voice coil 37. The windings of stationary windings $31_{w1}$ and $31_{w2}$ are differentially or "contrary" wound so that any motion of pole magnet 36 is enhanced because one coil winding picks up motion changes due to the north pole and the other coil winding picks up motion changes due to the south pole. Thus, signals are developed to provide a "velocity" signal to be used as one of the inputs of the servo-amplifier which drives the voice-coil.

Due to close proximity of the velocity-transducer and the main magnetic circuit for the voice-coil, changes in the voice-coil current and position could affect the velocity transducer were it not for the differentially wound coil windings $31_{w1}$ and $31_{w2}$ which cancel out and obviate such extraneous interference.

The "full stroke" access time of the actuator is typically 16 milliseconds with an "average" access time of 9 milliseconds while the track-to-track access time is 4 milliseconds.

Bit densities on the disk may typically range from 5950 bits-per-inch (BPI) to 8000 BPI. The transfer rates may typically range from 6.5 to 9.7 million bits per second.

There are five information bands on one side and four information bands plus one servo band on the other side of the disk. The total travel of the actuator is limited to 250 cylinders (nine information tracks per cylinder) or + or − ¼ inch at 500 TPI (transitions-per inch).

This provides a short-travel, low-mass, closed, and centrally balanced mechanical arrangement which together with low coil induction make it possible to access any track within 16 milliseconds at one-tenth the force (7 pounds peak) needed for the conventional type of voice-coil actuators.

Since these actuator controls can be shared between two separate Disk File Modules, analog switching must be performed to multiplex the feedback and control signal. However, the peak voice-coil current of four amperes, cannot easily be multiplexed and consequently in the preferred embodiment considered, a 20 watt hybrid power amplifier is needed for electrical conveyance to each Disk File Module.

The Read/Write circuit 55 provides, in a conventional manner, control and power for Read/Write transducing operations.

The Maintenance Control unit 56 of conventional form, supplies a power on/off indicator switch, two sets of load/run indicator switches, a write protect indicator switch and a Disk File Module address switch (not shown).

The Fail-Safe Control unit 57 provides safety circuits which, in a conventional manner, monitor the module for unsafe conditions that might cause destruction of information in the event of a component failure or circuit malfunction. This detection of such a condition would result in an automatic disconnect and a power shutdown of the particular Disk File Module.

The power supply unit 58 is also of conventional form and provides power for the Disk File Module or power for a plurality of Disk File Modules. In order to render this system independent of the AC power distribution system, a DC converter is used to supply the various required voltages; thus, the converter can be supplied with a 12 volt DC input and would generate a plus or minus 24 volt output, a plus or minus 12 volt output and a plus or minus 5 volt output.

The entire preferred system can operate in an environment where temperatures are kept between 40° Fahrenheit and 100° Fahrenheit and the humidity is less than 90%.

In the past the mechanical complexity of disk pack drives and the exposure of their most critical components to environment had considerably limited the reliability of these drives. By enclosing the critical components in a sealed module, and by limiting the components subject to friction and wear to the two precision bearings in the motor-spindle, the reliability of the disk system is now increased by a large order of magnitude. Thus, now the mean time between failures may typically be better than 10,000 hours. Further, when a failure occurs, the mean time to repair the units with a replacement module by a semiskilled person can be less than one-half hour.

The failure of an internal component of a Disk File Module would require exchanging the module and sending it to a specially equipped service center. If necessary the information can be retrieved from the disk of the impaired Disk File Module provided that there was no catastrophic disk crash which occurred on all the bands of recorded information. This recovery can be accomplished by mounting the disk together with its rotor and rotor frame on a special drive which can position read heads over the information tracks with the help of a track-follower servo.

The mechanical arrangement of the Disk File Module lends itself to high system flexibility without major redesign. Up to three additional independent voice-coil actuators, which operate in a synchronous relationship, can be added to a single Disk File Module, so that there may be at least four actuators all synchronously operative for transducing operations with the magnetic disk. Also as discussed previously, there is the flexibility which provides for a "mix" of transducing systems wherein there can be a plurality of positionable transducing systems controlled by the above-described type actuator and this can be combined with one or more fixed-head-per-track systems which might be desired for the accessing of certain special information tracks.

The storage capacity dedicated per channel can typically vary from 80 million bits to 360 million bits for the actuator channels. All four actuator channels of the Disk File Module have independent Read/Write and access capabilities; thus, in the Electronic Module 50E there is a Data Channel Control for each actuator channel and an additional Actuator Servo Control for each voice-coil actuator assembly 30.

Another flexible aspect of the system is the possibility of introducing further cooling means into the system by placing, for example, a squirrel cage impeller on the shaft $21_r$. This can be combined with a positive filter pressurized air system which can be easily fitted onto the underside ribbing of the Disk File Module.

Under normal conditions the metallic base plate casting $10_b$ and the metallic flanges $7_{f1}$, $7_{f2}$, $7_{f3}$, $7_{f4}$ provide means for conducting away the heat generated internally. However, a greater amount of internal cooling capacity can be accomplished by the above-referenced air circulation system without any substantial change in the design configuration of the Disk File Module. Another means for facilitating cooling within the scope of the present design is to make the top cover $10_a$ of metallic material which will also help conduct heat away from the internal system.

Having thus described a low-mass, fast-access short stroke, voice-coil motor actuator which is used with a sealed unitized Disk File Module, the following claims are made:

What is claimed is:

1. A voice-coil actuator system comprising:
    a. a main magnetic circuit having a pole shoe and a magnet forming an air gap;
    b. a voice-coil residing and moving totally within said air gap;
    c. means for supporting said voice-coil;
    d. means for developing a signal for sensing motion of, direction of, and velocity of, said voice-coil including:
        d-1. means for obviating the effect of changing magnetic fields due to voice-coil motion in said air gap of said main magnetic circuit.

2. The actuator system of claim 1 wherein said main magnetic circuit includes:
    e. an annular ring magnet having first and second polar faces;
    f. a cylindrical pole of magnetic material placed axially within said central opening of said annular ring magnet, said cylindrical pole having extending flanges at one end to form a base plate which abuts against the periphery of said first polar face of said annular ring magnet;
    g. an annular pole piece of laminated magnetic material which is placed to abut the second polar face of said annular ring magnet and forming an annular air-gap between itself and one end of said cylindrical pole;
    h. and wherein said cylindrical pole has an axial bore-opening therethrough.

3. The voice-coil actuator system of claim 2, wherein said means for developing a signal includes:
    d-2. a differential velocity transducer mounted concentrically in and around said axial bore-opening of said cylindrical pole material, said differential velocity transducer including:
        d-2a. a central support rod passing through said axial bore-opening of said cylindrical pole material, said central support rod carrying a pole magnet having its poles oriented in the axial direction;
        d-2b. a first and second coil of stationary windings encompassing the axial bore-opening of said cylindrical pole material;
        d-2c. said central rod carrying a bobbin which supports said voice coil within the air gap between said annular pole piece and said one end of said cylindrical pole material.

4. The voice-coil actuator system of claim 3 wherein said
    first and second coil windings are wound differentially and encompassed by a magnetic shield to prevent any magnetic interference from any fields other than that of the said axially-oriented pole magnet in said axial boreopening, and
    said means for supporting said voice-coil comprises an axially movable integrated unit including:
        said central support rod,
        said axially located pole magnet,
        said bobbin for mounting said voice-coil, a pair of spring flexures holding said central support rod, wherein
the periphery of said flexures are anchored, an extension-arm for holding a plurality of transducing heads.

5. A voice-coil actuator and positioner unit comprising:
a. a main magnetic circuit means made of a magnet and magnetic material in a cylindrical configuration and having pole faces and producing a magnetic field across an annular air gap;
b. a central bore-opening residing centrally and axially within said magnetic circuit means;
c. a voice-coil residing and moving totally within said annular air gap;
d. a bobbin, on which is mounted said voice-coil;
e. a differential velocity transducer mounted around and within said central bore-opening and including:
  e-1. a central support rod capable of longitudinal and rotary motion, said support rod holding said voice-coil bobbin;
  e-2. a first and second coil winding encircling the periphery of said central bore-opening;
  e-3. a pole magnet held by said support rod and residing within said bore-opening with the first and second poles of said pole magnet being locationally oriented within the central area of the axis of the respective first and second coil windings;
  e-4. said first and second coil windings being connected differentially so as to provide an electrical signal representative of the velocity, acceleration and direction of said pole magnet, which pole magnet moves in coordination with movement of said voice-coil;
f. first and second spring flexures holding said center support rod;
g. an extension arm supported by said central support rod.

6. The actuator and positioner unit of claim 5 wherein said differential velocity transducer includes a magnetic shield around the periphery of said first and second coil winding.

7. The actuator of claim 5 including:
a. a plurality of transducing head units residing on said extension arm wherein said extension arm includes a pivot around which one edge of said extension arm may be elevated or depressed;
b. a solenoid for imparting rotary motion to said central rod;
c. a cam connected to said central rod;
d. said cam being placed in proximity to one end of said extension arm and capable of causing a pivoting action to said extension arm.

8. The actuator of claim 5 wherein said air gap separating the pole faces has a length greater than the axial length of said voice-coil; and
wherein no portion of said voice-coil moves beyond the said annular air gap.

9. An electromagnetic actuator and transducer positioner comprising:
a. means for supplying a magnetic field;
b. an air gap having magnetic flux provided by said means for supplying said magnetic field;
b1. a voice-coil residing and moving within said air gap;
c. an axial bore within said means for supplying a magnetic field;
d. a differential velocity transducer located around the periphery of said axial bore and within including:
  d-1. first and second coil windings around the periphery of said axial bore;
  d-2. a magnetic encompassing the periphery of said first and second coil windings;
  d-3. a central rod, movable within said axial bore, said rod carrying:
    d-3a. pole magnet whose north and south poles reside and move within the interior of said respective first and second coil windings;
e. said central rod also carrying:
  e-1. a bobbin which supports said voice-coil winding within said air gap;
  e-2. an extension arm for holding a plurality of transducing heads;
  e-3. a plurality of transducing heads;
f. a first and second spring flexure for supporting the extremities of said central rod and permitting axial motion of said rod;
g. means for providing electrical signals to said voice-coil for repositioning the position of said transducer heads.

10. The actuator of claim 9 wherein:
h. said bobbin includes a pivot for permitting rotation of said extension arm.

11. The actuator of claim 10 including:
i. means for rotating said central rod;
j. means for elevating and/or depressing said extension arm.

12. The actuator of claim 11 wherein said means for rotating said central rod inclues a solenoid; and
said means for elevating/depressing said extension arm includes a cam connected to and responsive to rotation of said central rod.

13. An electromagnetic actuator comprising:
a. means for developing a magnetic field across an air gap;
b. an axial bore within said means for developing said magnetic field;
c. a bobbin, movable within said air gap;
d. a coil wound around said bobbin;
e. a differential velocity transducer, encompassing said axial bore, for developing a signal representative of the motion of said coil and bobbin, said transducer including:
  e-1. a magnetic shield which encompasses said transducer;
  e-2. a central rod, movable longitudinally, which supports said bobbin and voice coil;
  e-3. a first and second winding, wound differentially, and encompassing said axial bore, for sensing motion of a pole magnet within said axial bore;
  e-4. a pole magnet within said central movable rod;
f. a plurality of flexures for holding said movable rod in a longitudinal position yet permitting a limited amount of forward and reverse motion;
g. wherein no portion of said coil ever moves beyond the space of said air gap; and
h. wherein said central rod is rotatable in said axial bore;
i. means to rotate said central rod.

14. In a voice-coil positioner for transducing heads in a magnetic disk system, the combination comprising:
a. a cylindrical form of magnetic material forming a magnetic circuit and including:
  a-1. a magnet, a-2. a main air gap,
  a-3. a central and axial bore-opening,
b. a voice-coil winding residing and moving only within said main air gap;
c. a movable bobbin for supporting said voice-coil winding, said bobbin carrying:
  c-1. an extension arm,
  c-2. a plurality of transducer heads on said extension arm,
d. first and second spring flexures having centers mounted in alignment with the axis of said central bore-opening;
e. a movable central rod residing within said central bore opening and supported at its extremities by said first and second spring flexures;
f. a differential velocity transducer which includes:
  f-1. first and second coil windings connected differentially and placed annularly around said central bore opening,
  f-2. a bar-magnet mounted on said central movable rod and having a north pole and a south pole, said bar-magnet being so normally oriented such that one pole of said magnet resides and moves within the interior of one of said differential coil windings and the other pole of said bar-magnet resides and moves within the interior of said second of said differential coil windings,
  f-3. said movable central rod within said central bore being integrally connected with and supporting said bobbin,
  f-4. wherein said first and said second differential coil windings develop a signal sensitive to the motion of said voice-coil but which cancel out any extraneous fields due to motion of said voice-coil within the main air gap and magnetic field of said voice-coil magnetic circuit.

* * * * *